(12) United States Patent
Haque

(10) Patent No.: US 12,468,741 B2
(45) Date of Patent: Nov. 11, 2025

(54) NETWORK ACQUISITION OF SPORTS-RELATED SERVICES

(71) Applicant: The Good Game, Inc., Lawrence, KS (US)

(72) Inventor: Mashhur Zarif Haque, Lawrence, KS (US)

(73) Assignee: The Good Game, Inc., Lawrence, KS (US)

( * ) Notice: Subject to any disclaimer, the term of this patent is extended or adjusted under 35 U.S.C. 154(b) by 0 days.

(21) Appl. No.: 18/233,187

(22) Filed: Aug. 11, 2023

(65) Prior Publication Data

US 2025/0053581 A1   Feb. 13, 2025

(51) Int. Cl.
*G06F 16/28* (2019.01)
*G06F 16/907* (2019.01)
*G06Q 20/10* (2012.01)

(52) U.S. Cl.
CPC .......... *G06F 16/288* (2019.01); *G06F 16/907* (2019.01); *G06Q 20/102* (2013.01)

(58) Field of Classification Search
None
See application file for complete search history.

(56) References Cited

U.S. PATENT DOCUMENTS

| | | | |
|---|---|---|---|
| 11,682,209 B2 * | 6/2023 | Patton | G06T 7/246 382/103 |
| 11,727,490 B1 * | 8/2023 | Thakker | G06Q 40/06 705/36 R |
| 2005/0246299 A1 * | 11/2005 | Scarborough | G09B 7/02 706/21 |
| 2013/0290202 A1 * | 10/2013 | Nunnery | G06Q 50/01 705/319 |
| 2014/0156568 A1 * | 6/2014 | Ganguly | G06Q 10/0637 706/12 |
| 2015/0142142 A1 * | 5/2015 | Campana | G06Q 10/0639 700/91 |
| 2016/0055426 A1 * | 2/2016 | Aminzadeh | G06N 7/01 706/12 |
| 2017/0109015 A1 * | 4/2017 | Krasadakis | G06F 16/335 |
| 2019/0066243 A1 * | 2/2019 | Watkins, Jr. | G06F 16/904 |
| 2019/0196421 A1 * | 6/2019 | Littlefield | G06Q 10/0639 |
| 2019/0325354 A1 * | 10/2019 | Rajnayak | G06F 18/2413 |
| 2020/0108291 A1 * | 4/2020 | Piazza | G16H 20/30 |
| 2020/0128902 A1 * | 4/2020 | Brown | A42B 3/30 |
| 2020/0160180 A1 * | 5/2020 | Lehr | G06N 3/08 |
| 2020/0302296 A1 * | 9/2020 | Miller | G06N 20/20 |
| 2021/0275059 A1 * | 9/2021 | Yates | A63B 24/0062 |
| 2022/0004903 A1 * | 1/2022 | Torsson | G06Q 10/10 |
| 2022/0128908 A1 * | 4/2022 | Larranaga | G03F 7/70483 |

(Continued)

*Primary Examiner* — Khanh B Pham
*Assistant Examiner* — Navneet Gmahl
(74) *Attorney, Agent, or Firm* — Erise IP, P.A.

(57) ABSTRACT

A sports services system may obtain sports-related data from various entities for matching the various entities across a network using statistical and machine learning algorithms to maximize an objective of the various entities. The various entities may comprise athletes, trainers, agents, parents, and sports organizations at any level. User data associated with each entity may be compared to maximize the opportunities for each entity to provide best options for sports achievements, goal realization, and career development while maintaining social and emotional health for all entities.

20 Claims, 4 Drawing Sheets

(56) References Cited

U.S. PATENT DOCUMENTS

| | | | |
|---|---|---|---|
| 2022/0343286 A1* | 10/2022 | Joao | G06Q 10/1053 |
| 2023/0016916 A1* | 1/2023 | Lawrence | G06Q 30/0273 |
| 2023/0091610 A1* | 3/2023 | Tamazlykar | G06N 3/08 |
| | | | 706/11 |
| 2023/0289771 A1* | 9/2023 | Chapman | G06Q 30/0631 |
| | | | 705/66 |
| 2023/0325924 A1* | 10/2023 | Shore | G06Q 40/06 |
| | | | 705/36 R |
| 2023/0334365 A1* | 10/2023 | Nawab | G06F 16/2468 |
| 2023/0367388 A1* | 11/2023 | Massengill | G06N 3/09 |
| 2023/0409402 A1* | 12/2023 | N | G06F 11/3409 |
| 2024/0005398 A1* | 1/2024 | Sajda | G06Q 40/04 |
| 2024/0119470 A1* | 4/2024 | Paul | G06Q 30/0202 |

\* cited by examiner

NETWORK ACQUISITION OF SPORTS-RELATED SERVICES

BACKGROUND

1. Field

Embodiments of the current disclosure relate to providing networking connections for sports-related services. Specifically, embodiments of the current disclosure relate to facilitating sports-related connections between entities based on entity profiles using machine learning.

2. Related Art

Typically, trainers and athletes connect via word of mouth, online postings, advertisement, or through local brick and mortar training facilities. Parents take their children to the local sports training facility and meet with an instructor or trainer based on availability and classes. Many times, these classes are standardized for groups of athletes and set according to a specific schedule during the week. In many cases the student doesn't get to be in the class that may be best suited for the student. Likewise, the instructor, or trainer, may also be restricted to classes based on mass need rather than individual needs of the trainer and/or the athlete. Furthermore, the athletes and trainers are typically restricted by location.

Current methods of ranking, evaluating, and recruiting athletes include leveraging local scouts to watch athletes and provide feedback on their performance. In some cases, athletes come together in large groups for "combines" to demonstrate skills for attending recruiters or coaches. Typically, if the recruiting entity is interested in the athlete, the recruiting entity will then send a representative to watch the athlete or bring the athlete to their facility for a supervised workout. This is a long, drawn-out process that results in a large network of people to find, evaluate, and network with recruits. In some cases, recruits may be overlooked by local scouts with little experience.

What is needed is a networking application providing knowledge of the athletes and training programs for optimal matching of athletes, trainers, programs, education facilities, and the like.

SUMMARY

Embodiments of the invention solve the above-described problems and provide a distinct advance in the art by providing a sports services system that determines likelihoods of achieving successful objectives between sports-related entities. Data associated with the sports-related entities may be analyzed by statistical and/or machine learning algorithms to match sports-related entities that provide a high likelihood for maximizing objectives of the sports related entities.

An embodiment comprises one or more non-transitory computer-readable media storing computer-executable instructions that, when executed by at least one processor, perform a method of optimally connecting a first entity with at least one second entity over a communication network for providing sports-related services. The method comprises obtaining entity data associated with the first entity, wherein the entity data comprises a plurality of input parameters indicative of a sports profile of the first entity, obtaining a sports-related objective of the first entity, obtaining global entity data from a plurality of sports-related entities, comparing, by a machine learning algorithm trained on a history of sports-related data, the plurality of input parameters with the global entity data from the plurality of sports-related entities, and determining a likelihood of success of the sports-related objective associated with the at least one second entity of the plurality of sports-related entities based on a set of associated input parameters of the at least one second entity.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
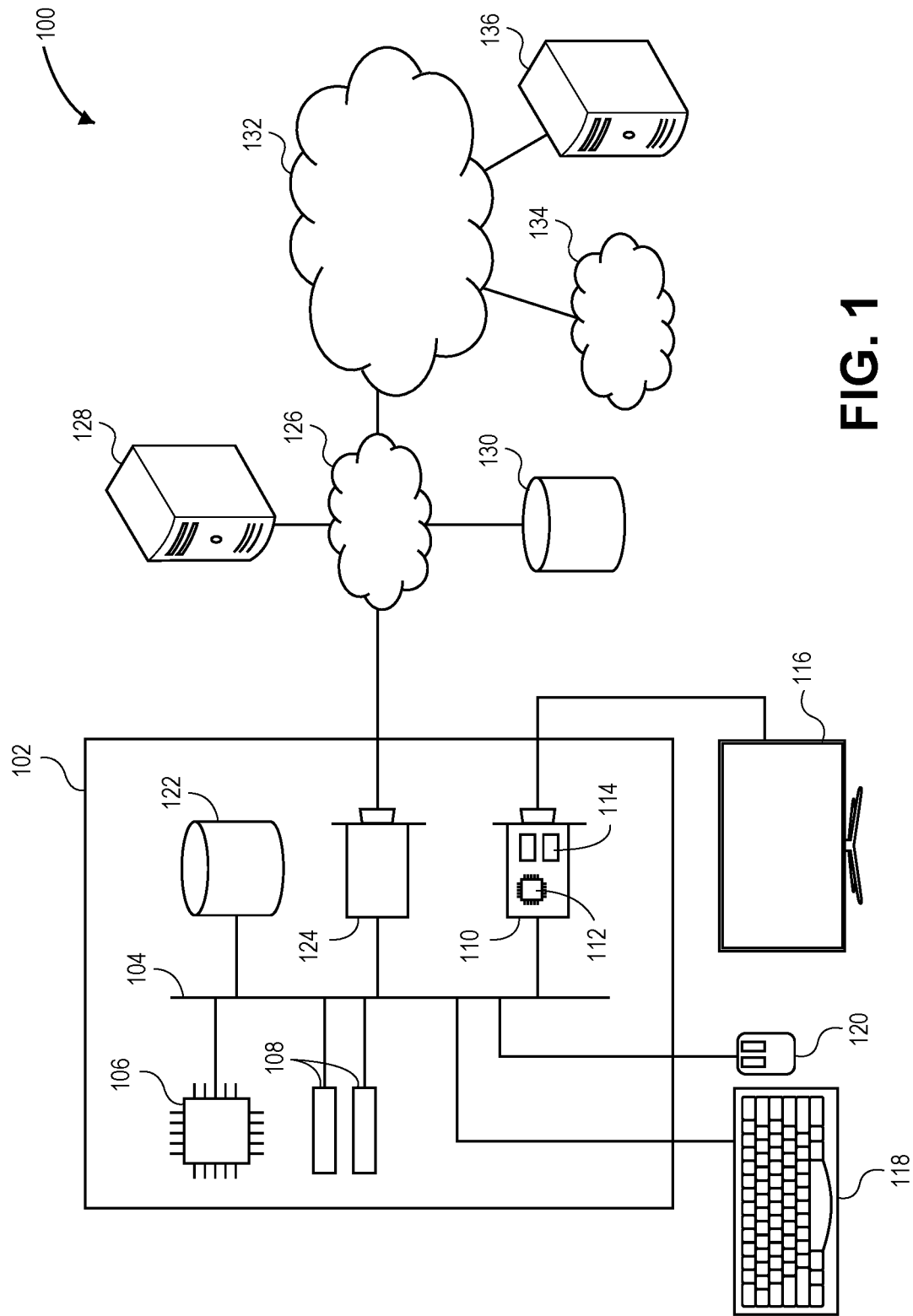
FIG. 1 depicts an exemplary hardware platform that for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Generally, embodiments of the current disclosure comprise facilitating optimized connections between entities based on learned histories of success of connections between sports-related entities. A sports services system may obtain sports-related data from various entities for matching the various entities across a network using statistical and machine learning algorithms to maximize an objective of the various entities. The user data associated with each entity may be compared to maximize the opportunities for each entity to provide best options for sports achievements, goal realization, and career development while maintaining social and emotional health for all entities.

Entities, as described herein, may be any computing device user, business entity, company, non-profit, person, group of people, and/or sporting team/group such as, a local club, an individual athlete, a trainer, a training club, a youth program, an elementary-/middle-/high-school, college/university and/or professional team associated with embodiments of the sports services system in the current disclosure. Any entity may connect with any other entity via the sports services system. Generally, as a matter of example, the description herein is between a trainer and an athlete. Though, it should be noted, that this is exemplary, and the trainer and athlete described herein may be any entity described above.

As a matter of example, a plurality of trainers may be looking to provide education classes to the plurality of athletes, and a plurality of athletes may be looking for training classes at various times and locations. In some embodiments, trainers of the plurality of trainers may also be athletes at higher levels than the athletes looking for education. For example, a trainer may be a college basketball player that may specialize in defense. The trainer may provide a defensive training class virtually, in-person, or in a hybrid-style setting (i.e., in-person and virtually). The defensive training class may be posted on a sports services website and advertised across social media sites or any other media outlet. The sports services system may provide the advertisement, sign up for the training class, facilitate communication between the trainer and the athletes, and provide the class virtually or in a hybrid style. In some embodiments, the sports services system may provide contracts and facilitate payment for the classes by the sports services system through integration with third-party applications provided on secure servers. Furthermore, the contracts and payment for the trainers may be provided in specialized documentation for payment through programs such as Name, Image, and Likeness (NIL) through the National Collegiate Athletic Association (NCAA), professional organizations such as, for example, United States based sports organizations such as the NFL, MLB, NBA, WNBA, MLB, NWSL, PGA, LPGA, or the like including subsidiaries. These exemplary U.S. sports organizations are not limitation and the sports services system described herein may extend to any other country or international group comprising sports organizations at any level.

In some embodiments, the sports services system may provide data acquisition and analytics for the various sports and/or may facilitate integration with existing analytics systems. For example, sensors may gather data indicative of a high-school golfer's swing. The data may be analyzed using machine learning algorithms to provide to any other entity ranking data, technique improvement data, NIL value data, and the like. In some embodiments, user provided information, classes, analytics, and any other obtained user data may be used to create a profile for any entity. The various entities described herein may be matched based on various statistical and/or machine learning algorithms according to the entity profiles and historical success of maximizing entity objectives.

Turning first to FIG. 1, an exemplary hardware platform 100 that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
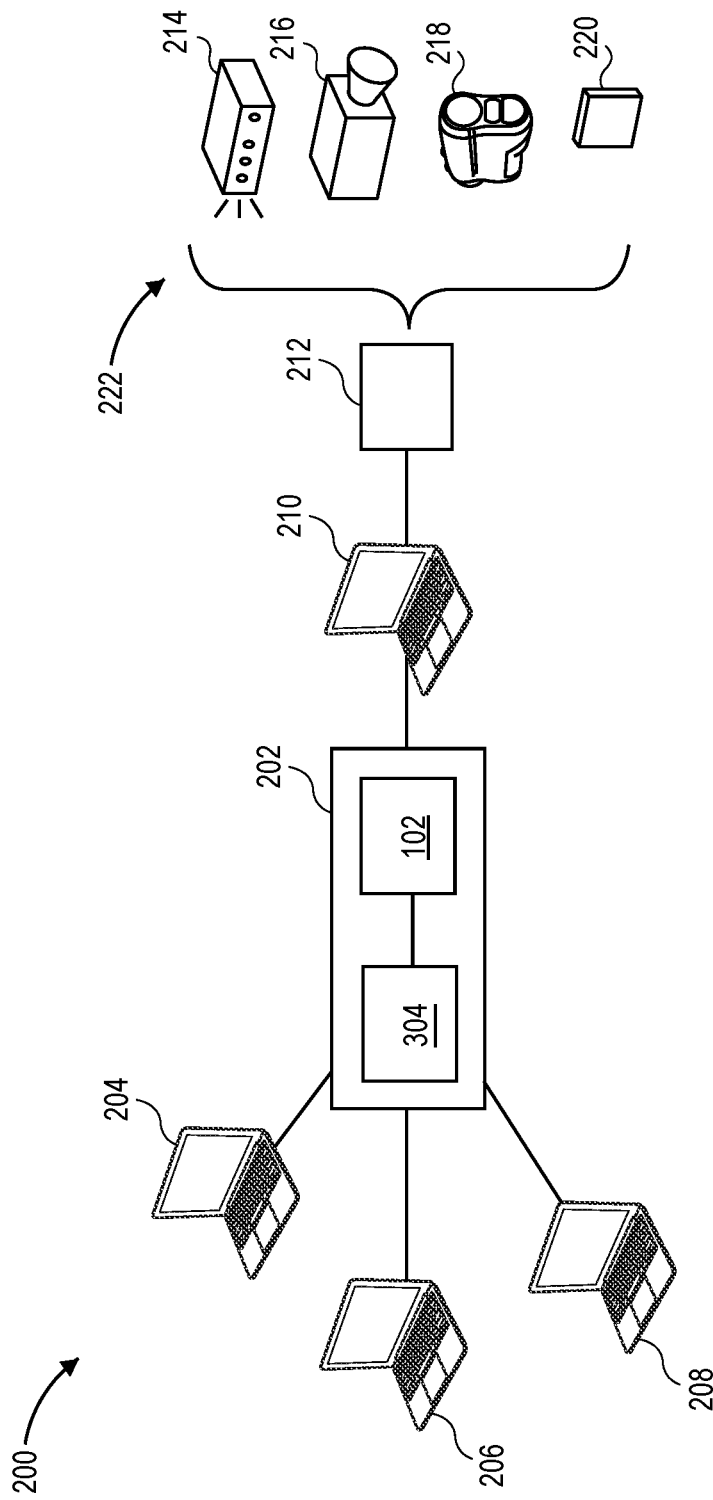
FIG. 2 depicts an embodiment of a sports services system comprising a communication network linking entities.

FIG. 2 illustrates sports services system 202 comprising a communication network facilitating communication between a network of device 200 serving various entities for acquiring sports-related services. In some embodiments sports services system 202 may communicate with exemplary first entity computing device 204 and second entity computing device 206. Here, the various computing devices may be computer 102 as described above. Furthermore, sports services system 202 may be computer 102 and may provide various services to the various user computing devices. The computing devices may run a sports services application in communication with sports services system 202 and/or may provision a cloud-based service from sports services system 202. Sports services system 202 may cause display of a user interface by the various computing devices and generate the functionality for providing the sports-related services described herein.

In some embodiments, sports services system 202 may communicate with computing devices 204, 206, 208, and 210, data acquisition programs 212 and sensors 222, wherein computing device 210 may be third-party servers for data acquisition and analytics, and the like. In some embodiments, third-party entities may provide additional services such as, for example, sports psychiatry, career advancement and placement, and the like by third-party computing device 208.

Users of sports services system 202 may be, for example, trainers and athletes accessing sports services system 202 by first entity computing device 204 and second entity computing device 206. Trainers may provide various data to a trainer profile to acquire students/athletes for training classes. The trainers and the athletes may provide user data that may be used to generate user profiles, the user data including items such as relevant sports, classes for teaching or desired/objective learning, focus of class (e.g., offense, defense, shooting, dribbling, passing, throwing, accuracy, speed, strength, swing, and any combination thereof). Furthermore, trainers and athletes may provide information such as age, sex, gender, race, background, physical characteristics, mental acumen, certifications, education, experience, and the like, which may be input as stored as user data associated with the entity (e.g., athlete or trainer) profile. The user data may be accessible to trainers, recruiters, and the like. For example, the user data (including video) may be aggregated into virtual combines to allow recruiters to view a collection of eligible athletes or athletes playing a particular position.

In some embodiments, sports services system 202 may provide waivers to all or a portion of the user data. The user may customize the data that is available to outside parties by tiers. The user may create various tiers of user data. For example, tier 1 may include performance metrics, such as speed, jump, explosiveness measurements, etc. Tier 2 may include physical characteristics, such as height, weight, arm length, head size and the like. Tier 3 may include items, such as locations, college/professional interests, goals, and the like. Tier 4 may include personal information, such as sex, ethnicity, home address, and the like. The user may provide access to the various tiers of data by customizing each tier and providing the data to individual other user's or signing waivers releasing the data to others.

In some embodiments, the trainer may input additional user data indicative of the trainer's physical characteristics, schedule and location, experience and certifications, and the like. The user data may include any information associated with any entity that may be used to evaluate the entity as described in embodiments herein. The user data may provide key data points that may be input into entity models for determining a likelihood of success for the users of sports services system 202. A profile for each user, the trainer in this example, may be stored such that the data associated with the trainer may be compared to other users to determine the likelihood of success if the trainer trains the other users. The likelihood of success may be based on matching data as well as historical data associated with the users and the history of the trainer. Here, an objective may be maximizing performance of an athlete. As such, the analysis may include the trainer's history of success of improving performance athletes that have participated in the trainer's classes.

In some embodiments, as described above, the entity may be a user and the user may be an athlete looking for a trainer or a training program. The athlete may represent an athlete at any level or may be a representative of the athlete such as a parent or a sports agent. Furthermore, in some embodiments, the trainer may be an agent or trainer representative. The athlete may input user data such as age, sex, gender, sport, team affiliates, favorite players, similar players, hobbies, schedule, location, experience, and the like. Furthermore, user data may be obtained from the user from third-party applications and databases, the user data including performance statistics, performance achievements, athletic history, social history, and the like. In some embodiments, the user data may be used to generate a profile for the athlete. Each user datum may be a data point in statistical and machine learning algorithms trained to connect the athlete with the trainer or training program to maximize the objectives of the athlete/trainer. The entity matching phase is discussed in more detail below.

As described herein, the user profiles may include information indicative of the specific entity to which the user profile is assigned. The user profiles may include entity type such as, for example, athlete, trainer, business, university, community college, professional, armature, and the like. The user data may be used to represent the entity for display to other entities by displaying some information about the entity. For example, sports services system 202 may cause display of a user interface by the computing devices 204-210 as described above. Furthermore, each data point of the user data may be used as an input into the statistical and machine learning models for analysis of the user data of all entity profiles. As such, the user data for each entity may include all data associated with and indicative of the entity to which the data is associated/assigned. As such, any entity may be represented by any data that the entity provides or is obtained or determined by sports services system 202. In some embodiments, the entities may customize the information that is displayed to represent them to other entities.

Furthermore, as shown in FIG. 2, sports services system 202 may communicate with sensors 222 and provide data analysis and virtual and augmented reality, generally referenced herein as VR. Sports services system 202 may obtain data from sensors 222 such as, for example, optical sensors 214, cameras 216, radar 218, and other general sensors 220 such as, for example, accelerometers, rate gyros, strain gauges, and the like. Data may be obtained via sensors 222 to evaluate activity of an athlete such as, for example, running, swimming, swinging, lifting, throwing, blocking, dribbling, shooting, and the like. The obtained data may be analyzed based on machine learning models trained on a stored history of training data as described in embodiments below. The obtained user data may be stored with the user profile and used to market the athlete and/or connect the athlete with various entities as described in embodiments herein. In some embodiments, sports services system 202 application may integrate with third-party applications providing the data acquisition, VR, and/or analytics described herein. The athlete may perform exercises or sports-related movements while the sensors record the data, and the data may be stored in the user profile and analyzed for matching, ranking, marketing, and the like.

In some embodiments, sensors 222 may comprise a plurality of cameras 216 for obtaining user data and providing simulations and comparisons. The plurality of cameras 216 may provide monitoring and simulation for golf, baseball, basketball, football, soccer, and the like. The athlete's performance may be quantified by sports services system 202. For example, a golfer may use a golf monitor for swing data acquisition. Sports services system 202 may use the obtained user data to analyze the golfer and determine an overall comparison to averages of professional athletes on the PGA tour, model a value for NIL in college, determine universities that are in need of a golfer of the golfer's profile, and the like. Furthermore, the analysis my detect characteristics in the golfer's swing that lead to negative results such as inconsistencies and/or shorter distances. Sports services system 202 may connect the golfer to local and/or virtual trainers that provide a high likelihood of correcting these negatives in the golfer's swing. Therefore, sports services system 202 provides optimal detection and connections to services to assist any entity with objectives in sports-related activities using the algorithms described in detail below.

In some embodiments, the plurality of cameras 216 may comprise a set of cameras for 3-dimensional modeling of the movements of the athlete. The three-dimensional model may be used to profile the athlete's performance characteristics as feedback for improvement. The three-dimensional models may also be stored in the athlete's profile and accessible by recruiters, draft analysts, and professional scouts and administrators.

In some embodiments, third-party computing device 208 may be associated with a third-party service for the entities. The third-party services may be, for example, psychiatrists, sports psychiatrists, medical establishments, financial professionals, agents, and the like. The third-party data may be input into analysis engine 304. In some embodiments, the third-party services may have access to the user data, user profile, and the results of any analysis performed by sports services system 202.

In some embodiments, sports services system 202 facilitates connections to the third-parties and provides recommendations based on the results of the analysis. In some embodiments, part of any objective may be to determine quality-of-life and well-being for any entity. If the quality-of-life and well-being scores are low, third-party psychiatrists may be provided. For example, an athlete may move from a rural location where they have lived their entire life to an urban environment for higher education on an athletic scholarship. Similarly, an athlete may move internationally. This may be a drastic change in the athlete's life. Analysis engine 304 may determine that there is a high likelihood that the athlete may suffer from mental illness or setbacks based on their social activities and has a high likelihood of moving back home after the first year. Therefore, third-party entities may be presented to the athlete such as, for example, psychiatrist, familiar clubs, social groups with similar hobbies and interests, cultural clubs, and the like. In some embodiments, international players may be put in contact with people from their home country. Furthermore, in some embodiments, local sports psychiatrists, medical professionals, financial professionals and the like, may be presented to the athlete based on the user data analysis and matching phase.

Figure 3:
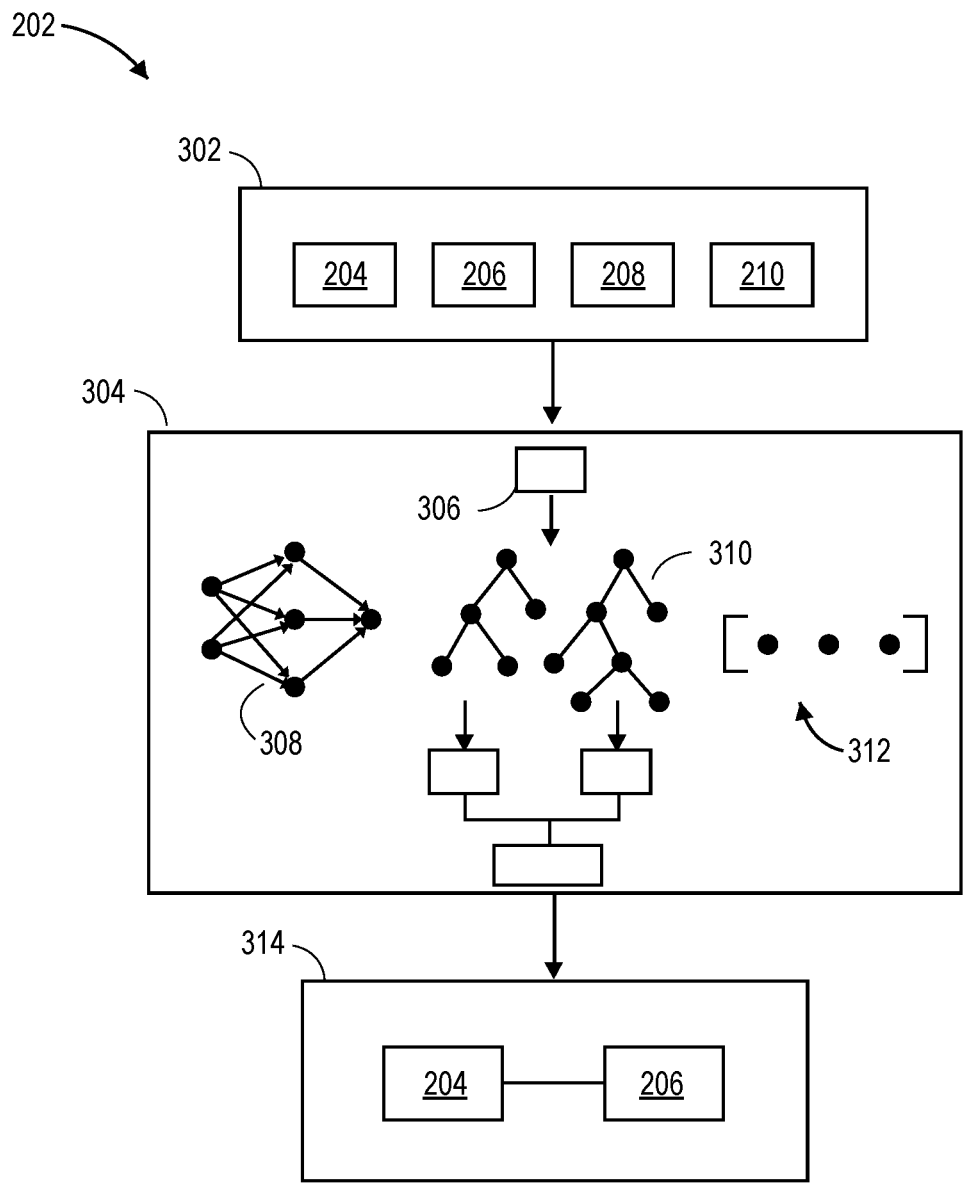
FIG. 3 depicts an embodiment of exemplary entities linked through statistical and machine learning algorithms.

FIG. 3 depicts an exemplary flow of data collected by sports services system 202 and fed into exemplary algorithms for analyzing the user data for evaluating the various entities for ranking and matching the entities. At block 302, data may be obtained by computing devices 204-210. The data may be indicative of entities from first entity computing device 206 and second entity computing device 206. Third-party computing device 208 may provide physical characteristics, psychologic data, experience, certifications, medical information, and the like from third-party entities. Computing device 210 may provide sports data and analytics from sensors or third-party data acquisition and analytics applications and/or databases. Furthermore, if the entity here is an educational institution, professional club, or the like, the data may be indicative of the team, players on the team, team needs, current player profiles, team needs, desired player profiles, financial budget, school size, associated conference, coaches, administrators, school population demographics, sports demographics, and the like.

Once the entire set, or global set, of user data is obtained, the user data may be organized and fed into analysis engine 304. At analysis engine 304, the user data may be precondition and classified for further analysis at block 306. Simple analysis may be performed such as general classifications. For example, entities may be classified by sport (e.g., soccer, baseball, basketball, etc.), sex, gender, location, or the like. Similarly, or alternatively, a more in-depth analysis may be performed for classifying and optimizing user data to store in the user profile such that the user data may be analyzed or pre-conditioned, for classification and matching.

In some embodiments, preconditioning may serve to standardize the data for analysis by neural network 308, decision trees and/or random forest 310, or other statistical and machine learning algorithms 312, and/or the user data may be feature engineered for more efficient analysis and quicker convergence of optimized results. The user data may be filtered using feature engineering models to maximize the rewards, representative of the objectives, for providing the best data to the predictive algorithms.

When data sets are found to have little or no effect on the outcome, these data sets may be eliminated from the user set for analysis in the predictive models. For example, the user data may be analyzed to find that the entity is a golfer looking for a division one collegiate program. In some embodiments, the user data may be analyzed, and it may be determined that the entity is a golfer and based on their statistics, experience, and the like, they should be looking for a division one collegiate program, or the golfer's determined ranking is college division-one level, so unnecessary data (here, non-division one programs) is filtered out prior to the matching phase. As such, a preliminary filter may be provided to efficiently process the user data in the predictive phases.

In some embodiments, the input states to the feature engineering model may be processed to determine features for input into the predictive models. Generating these features may reduce the total variables processed by the predictive model saving time and processing power during the inference phase of the predictive models. When the training phase is complete, the final model comprising the final features may be put into use processing new data as input by entities utilizing sports services system 202. In this way only variables that are useful to the given conditions may be used. This may be based on detecting specific data points such as "golf," "male," "swing speed," etc., and the like from the user profile of the golfer described above. Any of the algorithms described below may be used to classify and filter the user data for further analysis in the user data preconditioning phase.

After the user data has been filtered for more efficient and affective analysis, the data may be fed into the predictive models, or "matching" phase. The matching phase may comprise one or more machine learning algorithms trained for matching entities to maximize a likelihood of success. "Success" here, may be any desired outcome, or objective, and may be represented as a likelihood compared to a threshold value. In some embodiments, success may be a high likelihood of athletic improvement, monetary compensation, contract signing, class attendance, achievement of defined goals, certification acquisition, prospect ranking improvement, team/club membership, recruiting, being recruited, and the like.

In some embodiments, the analysis may be performed by neural network 308, decision trees and/or random forest 310, or other statistical and machine learning algorithms 312 including clustering, optimal and greedy matching, regression analysis, and the like for determining the best fit for the first entity with the second entity based on the analysis of the user data of the first entity with global data of all entities initially classified to be potential matches. The algorithms may compare the user data with the global entity data to determine the highest likelihood of successfully maximizing or achieving the objective set forth by the first entity or an objective determined or defined by analysis engine 304.

In some embodiments, the objectives described above may be analyzed, but further objectives may be analyzed automatically to capture potential unknowns. For example, potential unknowns may be quality-of-life, physical and mental well-being, coach/athlete relationship, and the like. As such, social changes may be modeled. These extraneous objectives may provide warnings for an entity that social changes may negatively or positively impact the decisions to select education institutions, cities, countries, teams, coaches, trainers, and the like. Furthermore, trainers, coaches, teams, and the like may receive warnings of particular prospects based on a prospect's past. Modeling these social behaviors may impact the likelihood of success of connections between any entities and may be modeled alongside any athletic relationships described herein.

In some embodiments, an entity such as a recruit or an athlete, referenced as the athlete, may sign up to sports services system 202 and provide user data that can be used to generate the user profile described above. The data points of the user profile may then be analyzed for association with stored data points of other entities to generate a list of associated entities with a high likelihood of success. For example, a high-school basketball athlete may struggle with shooting free throws. The athlete, or representative, may open a profile on sports services system 202 to find a class teaching free throw shooting. The athlete may simply enter their profile including shooting percentages and the like, and analysis engine 304 may determine a likelihood of improving free throw percentage, location, scheduling, and compare any other relevant data points through the machine learning algorithms of the analysis engine 304. The one or more classes, camps, trainers, and the like with the highest likelihoods of successfully improving free throw percentage based on the attributes of both entities may be presented to the athlete. As such, the optimal solutions for the athlete are determined and provided to the athlete. These associations may connect athletes with trainers to provide the highest likelihood of strengthening that athlete's education and training.

In some embodiments, training facilities may be analyzed along with the coaches and trainers. Activities, classes, business hours, facility traffic, and the like may be evaluated for matching the best available facilities and trainers to the athlete. For example, the user may be an athlete that is looking for a trainer in a particular radius because the user only utilizes public transportation and is only available outside of school and a part-time job. These location and timing parameters may be input into sports services system 202 and evaluated for the best fit for the athlete. For the facility, the parameters such as, for example, court types, number of courts, class schedule, busy times, and the like may be evaluated from historic trends, bookings and booking trends, related searches and the like. As such, sports services system 202 may provide the facility and trainers with the highest match for the athlete's required location and availability as well as training needs.

The process for determining the best class/trainer/location to improve the athlete's training and education described above may be applied to an entity recruiting an athlete or attempting to find students for a class. For example, the entity may be a scout or recruiter. Continuing with the golf example above, the golfer may upload their user data creating a user profile by sports services system 202. Similarly, University A may be looking for a specific type of golfer. The golf team at University A may have many golfers that are accurate but struggle on long courses because University A's golf team lacks distance compared to the average. Analysis engine 304 may obtain user data associated with University A and the golfer and determine a high likelihood of the golfer signing with University A and University A's golf team improving by a calculated amount based on the additional statistics associated with the golfer's profile. Therefore, the golfer and University A may have a high likelihood of success and may both benefit from the match. As such, sports services system 202 connects the golfer with University A.

In some embodiments, prospects and trainers may be evaluated for performance and experience for certification. The user data may be analyzed by analyzing engine 304 to determine an athletic performance level associated with known thresholds for achievement. The known thresholds for achievement may be indicative of levels of certification of performance and training. The analysis may quantify experience, athletic achievements, student successes, recorded motions, statistics, and the like. For example, a trainer may be awarded a certification based on a tracked objective success of students of the trainer. In another example, a martial arts athlete may record themselves performing combat moves, or a history of competitions and results may be stored and analyzed. The recording may be analyzed by the machine learning algorithms and a level of achievement indicative of a belt color designation may be applied. The martial artist may then be digitally awarded the belt and a notification may be sent to a trainer of the martial artist that the martial artist has achieved this milestone. Similarly, a golfer may record course scores and analysis engine 304 may track handicap based on the golfer's scores and course statistics. The handicap may be updated regularly based on the previous 20 courses played and the results. The certifications may be evaluated by regulatory agencies and/or representatives for accuracy and/or may be accepted based on successful output and reputation of accuracy.

In some embodiments, sports services system 202 may provide time and location searching, scheduling, and certification for workouts, physicals, drug testing, and the like. Many sports organizations require physicals and drug testing as well as some certifications to start a season. Teams may provide requirements and instructions by sports services system 202 to users to obtain these requirements before beginning practice or before the first match. Sports services system 202 may provide links, locations, and scheduling for the users to fulfill these requirements before the deadlines. Furthermore, sports services system 202 may provide transportation requests along with the schedules such that users may have access to the necessary facilities. As described herein, sports services system 202 may interface with third-party apps for scheduling the physicals, drug tests, and the like.

In some embodiments, prospects may be ranked for various levels of athletics such as high school, college, and professional. The inputs to the above-described algorithms may be indicative of the prospect's performance (or talent measurements) as well as physical characteristics (e.g., height, weight, speed, quickness, explosiveness, hand size, foot size, head size, frame, etc.). The user data may be analyzed by analysis engine 304 to classify athletes and rank the athletes according to the classifications. For example, the athletes may be classified in a first category of football players, in a second category by offense or defense, in a third category by position (e.g., defensive line including sub-categories of edge, defensive end, interior; defensive back including sub-categories of safety, corner, nickel; linebacker, etc.). These rankings may be based at least in part on the above-described performance metrics or talent of the prospects. The user data associated with each athlete of the plurality of athletes may be analyzed by analysis engine 304 to rank likelihood of success at the respective levels of competition based on historical training data. For example, the machine learning algorithms may be trained on the success and user data of historic athletes providing algorithms for determining a likelihood of success for each prospect of the plurality of prospects at each level of athletics and each category of sport and position. The analysis results may be provided to sports institutions of the various levels of competition such that the sports institutions may better evaluate the prospects. Sports services system 202 may then connect the entities with the highest likelihood of success at block 314.

Furthermore, the above-described prospect rankings and likelihood of success for players may be made available to both national and international teams. As such, teams may be looking for players of a particular metric similarly to the golf example above. For example, a football club in England may be looking for a striker with certain performance metrics. The football club may input the desired parameters defining their "ideal" striker. The highest match may be Brazilian footballer under contract with a different club. Sports services system 202 may determine market value for the Brazilian footballer comprising contract details as well as trade value. In some embodiments, sports services system 202 may locate value (players/compensation) on the current roster of the English football club and request permission to make an offer. Once permission is obtained, sports services system 202 may make the offer to the Brazilian football club that currently holds a contract for the Brazilian footballer. Furthermore, the Brazilian football club may accept the offer and sports services system 202 may conduct the trade by providing the required contracts and trade details.

In some embodiments, sports services system 202 may analyze the user data to predict NIL contracts and determine NIL value of athletes and NIL funds of potential colleges and universities. A financial potential of each athlete and educational program may be determined by the machine learning algorithms trained on the historical data. The prospect's athletic success and popularity may be modeled based on the user profiles weighted against the historic data. In some embodiments, the potential may be evaluated based on historical trends and linear, polynomial, and logarithmic functions may be utilized to predict future NIL value and possible contracts. As such, the NIL value of prospects may be determined and ranked. The prospects may be matched with colleges and universities based on maximizing NIL value, maximizing athletic potential, maximizing living conditions, maximizing a set of desires (i.e., objectives) associated with the prospect, or any weighted combination thereof. Future trends described here may be applied to any of the above-described analysis.

In some embodiments, the athlete may be represented by their parents and the training may be kids clubs, youth leagues, elementary/junior/senior high school, or the like. Sports services system 202 may provide a social community for the athlete's representatives. Sports services system 202 may provide communication including calendars and schedules and the like for parents to fill in as coach when other parents are on vacation or out. The parents may schedule ride shares or commuting options and reschedule practices and games when many athletes and/or parents are not available. The community aspect may further provide lists of users and schedules such that youth teams and organizations may be formed and run on sports services system 202.

Figure 4:
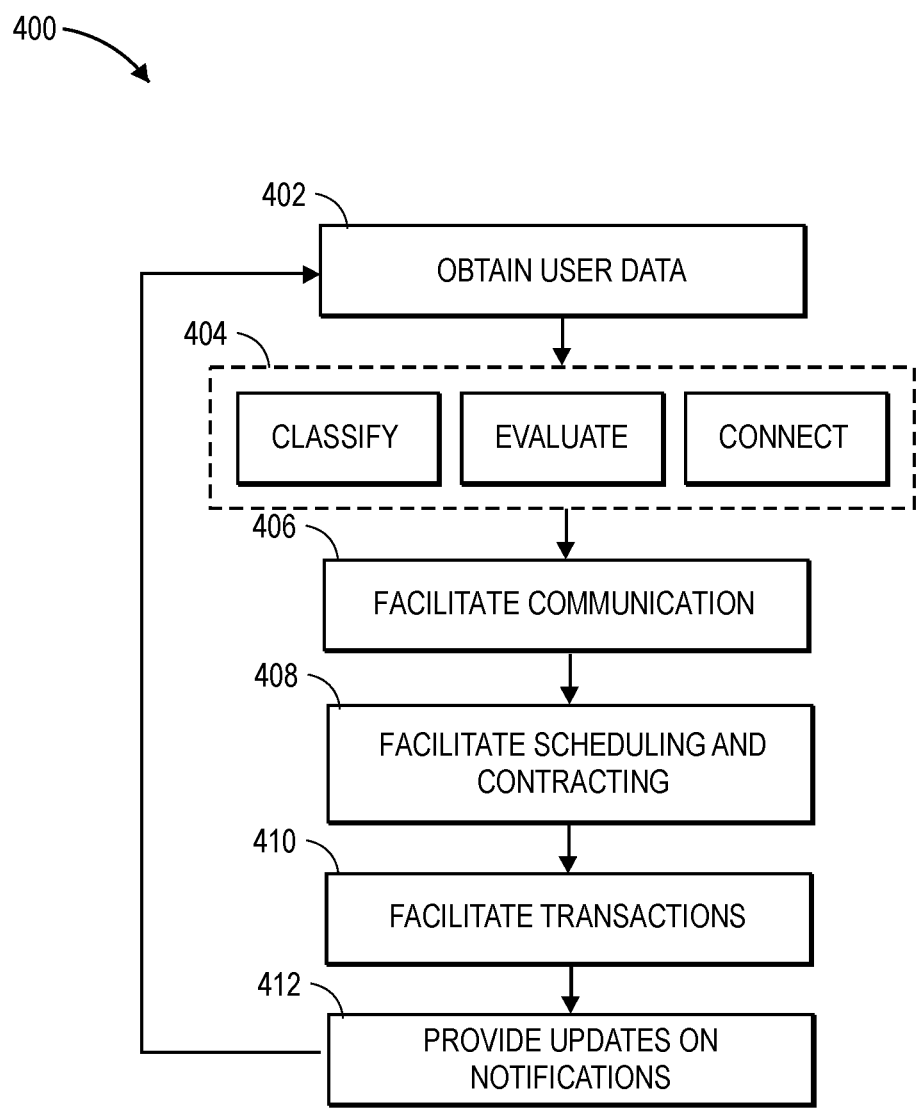
FIG. 4 depicts an exemplary process of connecting entities through machine learning analysis of sports-related input parameters.

FIG. 4 depicts an exemplary process 400 for linking entities across a network based on the user data analysis by sports services system 202. At step 402, sports services system 202 may obtain user data indicative of entities and the entities sport-related data. The user data may include user input data such as, for example, age, sex, gender, sport, team affiliates, favorite players, similar players, hobbies, schedule, location, experience, and the like. Furthermore, the user data may include obtained data such as, for example, sports performance statistics, athletic statistics, measurable data (e.g., physical characteristics, strength output, speed, endurance, etc.), video performance data, images, and the like. In some embodiments, entities may be athletic institutions (e.g., high-school programs, college and university athletic programs/teams, professional organizations, etc.). The user data associated with the athletic institutions may include offered sports categories and sub-categories, financial information (e.g., past, current, and future budget, etc.), team needs (e.g., position, player profile, statistics, etc.), and the like.

Furthermore, sports services system 202 may obtain and/or assign objectives to each entity of the plurality of entities.

The objectives may define an optimization objective for the entities. For example, objectives may be performance improvement, career development, goal achievement, financial improvement, awards and certification acquisition, lifestyle, wellness, and the like.

At step 404, the user data is input into analysis engine 304 where all global entity data may be classified, organized, and analyzed to match entities based on the user data while finding the highest likelihood of obtaining a successful objective. In some embodiments, analysis engine may provide various machine learning algorithms for achieving the successful matches including neural network 308, random forest 310, and other algorithms 312 including matching algorithms maximizing the objective functions. Generally, step 404 comprises the above-described analysis, certifications, valuations, and the like for matching entities in a sports-related field. It should also be noted that a plurality of weighted objectives may be analyzed simultaneously as described above.

At step 406, once a set of high likelihood matches a determined, communication between the matched entities may be facilitated. A first entity may be provided a list of potential second entities for joining. The first entity may contact a second entity by a link to any communication service associated with the second entity such as, direct messaging, email, social media, or the like. This provides a networking link between the entities. In some embodiments, the communication may be provided directly through a user interface of sports services system 202 integrated with a third-party application.

At step 408, sports services system 202 may provide scheduling and contacting options. The scheduling and contracting options may be in the form of scholarships, membership offers, player commitments, class schedules, training sessions, professional contracts, trades, NIL commitments, and the like. Any scheduling and contracting signatures may be complete directly through sports services system 202 and/or through third-party secure servers and services.

At step 410, transactions for the above-described services and contracts may be established through sports services system 202 and/or third-party secure servers providing financial accounts. Sports services system 202 may either provide the transactions directly between accounts by integrating with applications of the financial accounts and/or may integrate with third-party transaction facilitation applications for providing the financial transactions.

At step 412, sports services system 202 may provide further communication and updating of any contracts, financial data, and the like. Furthermore, the processes described herein may be iterative and continuous and/or ongoing such that the objectives of the entities are tracked over time. Any performance improvements, certification acquisitions, awards, achievements, met goals, and the like may be automatically realized by analysis engine 304 and notifications may be provided to the corresponding entities.

All data may be tracked over time and fed back into analysis engine 304 for improving the machine learning models. As such, all models may be up to date for placement of entities in the sports world at any level.

In some aspects, the techniques described herein relate to one or more non-transitory computer-readable media storing computer-executable instructions that, when executed by at least one processor, perform a method of optimally connecting a first entity with at least one second entity over a communication network for providing sports-related services. The method includes obtaining entity data associated with the first entity, wherein the entity data includes a plurality of input parameters indicative of a sports profile of the first entity, obtaining a sports-related objective of the first entity; obtaining global entity data from a plurality of sports-related entities; comparing, by a machine learning algorithm trained on a history of sports-related data, the plurality of input parameters with the global entity data from the plurality of sports-related entities, and determining a likelihood of success of the sports-related objective associated with the at least one second entity of the plurality of sports-related entities based on a set of associated input parameters of the at least one second entity.

In some aspects, the techniques described herein relate to a media, wherein the first entity is an athlete and the at least one second entity is one of a college, university, and a professional sports team.

In some aspects, the techniques described herein relate to a media, wherein the sports-related objective includes: the athlete joining the at least one second entity; and a performance improvement prediction for the athlete.

In some aspects, the techniques described herein relate to a media, wherein the sports-related objective further includes: a quality-of-life prediction for the athlete; and a Name, Image, and Likeness (NIL) valuation for the athlete.

In some aspects, the techniques described herein relate to a media, wherein the sports-related objective is a first sports-related objective; and wherein the method further includes: obtaining a second sports-related objective of the at least one second entity, wherein the second sports-related objective is acquiring the athlete, and wherein at least one second entity data includes a first set of characteristics similar to a second set of characteristics of the plurality of input parameters of the first entity.

In some aspects, the techniques described herein relate to a media, wherein the machine learning algorithm includes one of a neural network, a random forest, and an optimal or greedy matching algorithm.

In some aspects, the techniques described herein relate to a media, wherein the method further includes: obtaining third-party analytics data of the first entity from a third party; generating an athletic profile of the first entity based on the third-party analytics data, and connecting the first entity to a plurality of teams of the at least one second entity looking for prospects with a similar profile to the athletic profile of the first entity.

In some aspects, the techniques described herein relate to a media, wherein the at least one second entity is a trainer providing a set of training classes; and wherein the method further includes generating a training class schedule, providing advertisements for the set of training classes by third-party social media sites; providing registration for the set of training classes, receiving registration from the first entity for a training class of the set of training classes, and facilitating payment from the first entity to the trainer for the training class.

In some aspects, the techniques described herein relate to a method of optimally connecting a first entity with at least one second entity over a communication network for providing sports-related services. The method includes obtaining entity data associated with the first entity, wherein the entity data includes a plurality of input parameters indicative of a sports profile of the first entity; obtaining a sports-related objective of the first entity, obtaining global entity data from a plurality of sports-related entities; comparing, by a machine learning algorithm trained on a history of sports-related data, the plurality of input parameters with the global entity data from the plurality of sports-related entities, determining a likelihood of success of the sports-related objective associated with the at least one second entity of the plurality of sports-related entities based on a set of associated input parameters of the at least one second entity; and facilitating communication between the first entity and the at least one second entity based on the likelihood of success of the sports-related objective.

In some aspects, the techniques described herein relate to a method, further including: facilitating a contract between the first entity and the at least one second entity for the at least one second entity to provide the sports-related services to the first entity, and facilitating a transaction between the first entity and the at least one second entity.

In some aspects, the techniques described herein relate to a method, wherein the transaction is performed under rules of National Collegiate Athletics Association (NCAA) under Name, Image, and Likeness.

In some aspects, the techniques described herein relate to a method, wherein the transaction transfers currency from the first entity to the at least one second entity for training.

In some aspects, the techniques described herein relate to a method, wherein the plurality of input parameters includes location, available times, sport interests, experience, age, sex, athletic statistics, and athletic experience.

In some aspects, the techniques described herein relate to a method, wherein the athletic statistics are obtained from a third-party application or a third-party database.

In some aspects, the techniques described herein relate to a method, wherein the first entity is a collegiate athlete and the at least one second entity is a plurality of professional sports organizations.

In some aspects, the techniques described herein relate to a method, further including periodically performing a background check on the first entity and the at least one second entity and notifying all associated entities of changes in the background check.

In some aspects, the techniques described herein relate to one or more non-transitory computer-readable media storing computer-executable instructions that, when executed by at least one processor, perform a method of optimally connecting a first entity with at least one second entity over a communication network for providing sports-related services. The method includes obtaining entity data associated with the first entity, wherein the entity data includes a plurality of input parameters indicative of a sports profile of the first entity, obtaining a sports-related objective of the first entity; obtaining global entity data from a plurality of sports-related entities, comparing, by a machine learning algorithm trained on a history of sports-related data, the plurality of input parameters with the global entity data from the plurality of sports-related entities, determining a likelihood of success of the sports-related objective associated with the at least one second entity of the plurality of sports-related entities based on a set of associated input parameters of the at least one second entity, facilitating communication between the first entity and the at least one second entity based on the likelihood of success of the sports-related objective, and facilitating schedules and contracts between the first entity and the at least one second entity.

In some aspects, the techniques described herein relate to a media, wherein the first entity is a parent of child athlete, and the schedules and the contracts include signing the child athlete up for a training session with the at least one second entity and paying an associated cost for the training session.

In some aspects, the techniques described herein relate to a media, wherein the at least one second entity is a student athlete and the associated cost for the training session is paid according to Name, Image, and Likeness rules associated with the student athlete.

In some aspects, the techniques described herein relate to a media, wherein the first entity is a professional athlete and the at least one second entity includes a professional sports organization and a third-party company, and wherein the schedules and the contracts include a first payment for playing for the professional sports organization and a second payment for marketing a brand of the third-party company.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

The invention claimed is:

1. One or more non-transitory computer-readable media storing computer-executable instructions that, when executed by at least one processor, perform a method of determining success for an athlete and a plurality of sports-related entities, the method comprising:
   obtaining, by one or more sensors, performance data comprising performance quantifiers associated with the athlete,
   wherein the one or more sensors comprises at least one camera;
   obtaining video data form the at least one camera;
   extracting, from the video data, the performance quantifiers associated with an athletic performance of the athlete;
   obtaining personal information indicative of a personal life of the athlete;
   storing the performance data and the personal information in a sports profile of the athlete;
   generating a three-dimensional virtual model of the athlete simulating the athletic performance of the athlete;
   obtaining global entity data from the plurality of sports-related entities,
   wherein the global entity data includes, for each sports-related entity of the plurality of sports-related entities, a personal history of athletes and athletic performances of the athletes associated with the plurality of sports-related entities;
   determining a likelihood of success of the athlete for each sports-related entity of the plurality of sports-related entities by analyzing the global entity data and the sports profile of the athlete;
   wherein the likelihood of success comprises a well-being score indicative of a projected physical and mental well-being of the athlete for each sports-related entity; and
   causing display of the likelihood of success for the athlete for each sports-related entity and the three-dimensional virtual model of the athlete.

2. The media of claim 1, wherein the plurality of sports-related entities is a high-school, college, university, or a professional sports team.

3. The media of claim 2, wherein the method further comprises:
   determining sports-related training to increase the likelihood of success for each sports-related entity; and
   recommending the sports-related training to the athlete.

4. The media of claim 3, wherein the likelihood of success further comprises a Name, Image, and Likeness (NIL) valuation for the athlete.

5. The media of claim 3, wherein the method further comprises selecting the plurality of sports-related entities for evaluation based on the sports profile of the athlete.

6. The media of claim 1, wherein the likelihood of success is determined by a machine learning algorithm comprising one of a neural network, a random forest, and an optimal or greedy matching algorithm.

7. The media of claim 1, wherein the method further comprises:
obtaining third-party analytics data of the athlete from a third party;
generating an athletic profile of the athlete based on the third-party analytics data, and
evaluating the plurality of sports-related entities based on the athletic profile of the athlete.

8. The media of claim 1,
wherein the plurality of sports-related entities comprises trainers providing a set of training sessions; and
upon selection of a trainer by the athlete, the method further comprises:
generating a training session schedule based on the personal information of the athlete;
receiving registration from the athlete for a training session of the set of training sessions; and
facilitating payment from the athlete to the trainer for the training session.

9. One or more non-transitory computer-readable media storing computer-executable instructions that, when executed by at least one processor, perform a method of determining success for an athlete and a plurality of sports-related entities, the method comprising:
obtaining, by one or more sensors, performance data comprising performance quantifiers associated with the athlete,
wherein the one or more sensors comprises at least one camera;
obtaining video data form the at least one camera;
extracting, from the video data, the performance quantifiers associated with an athletic performance of the athlete;
obtaining personal information indicative of a personal life of the athlete;
storing the performance data and the personal information in a sports profile of the athlete;
generating a three-dimensional virtual model of the athlete simulating the athletic performance of the athlete;
obtaining global entity data from the plurality of sports-related entities,
wherein the global entity data includes, for each sports-related entity of the plurality of sports-related entities, a personal history of athletes and athletic performances of the athletes associated with the plurality of sports-related entities;
determining a likelihood of success of the athlete for each sports-related entity of the plurality of sports-related entities by analyzing the global entity data and the sports profile of the athlete;
wherein the likelihood of success comprises a well-being score indicative of a projected physical and mental well-being of the athlete for each sports-related entity;
recommending a sports-related entity of the plurality of sports-related entities with a highest likelihood of success for the athlete; and
causing display of the likelihood of success for the athlete for the sports-related entity and the three-dimensional virtual model of the athlete.

10. The method of claim 9, further comprising:
facilitating a contract between the athlete and the sports-related entity for the sports-related entity to provide a service to the athlete; and
facilitating a transaction between the athlete and the sports-related entity for the service.

11. The method of claim 10, wherein the transaction is performed under rules of National Collegiate Athletics Association (NCAA) under Name, Image, and Likeness.

12. The method of claim 10, wherein the transaction comprises transferring currency from a first account associated with the athlete to a second account associated with the sports-related entity.

13. The method of claim 9, wherein the personal information comprises a schedule for the athlete.

14. The method of claim 13, wherein the personal information is obtained from a third-party application or a third-party database.

15. The method of claim 9, wherein the athlete is a high-school athlete, and the plurality of sports-related entities are collegiate athletics departments.

16. The method of claim 9, further comprising periodically performing a background check on the athlete and notifying the sports-related entity of changes in the background check.

17. A method of determining success for an athlete and a plurality of sports-related entities, the method comprising:
obtaining, by one or more sensors, performance data comprising performance quantifiers associated with the athlete,
wherein the one or more sensors comprises at least one camera;
obtaining video data form the at least one camera;
extracting, from the video data, the performance quantifiers associated with an athletic performance of the athlete;
obtaining personal information indicative of a personal life of the athlete;
storing the performance data and the personal information in a sports profile of the athlete;
generating a three-dimensional virtual model of the athlete simulating the athletic performance of the athlete;
obtaining global entity data from the plurality of sports-related entities,
wherein the global entity data includes, for each sports-related entity of the plurality of sports-related entities, a personal history of athletes and athletic performances of the athletes associated with the plurality of sports-related entities;
determining a likelihood of success of the athlete for each sports-related entity of the plurality of sports-related entities by analyzing the global entity data and the sports profile of the athlete;
wherein the likelihood of success comprises a well-being score indicative of a projected physical and mental well-being of the athlete for each sports-related entity;
recommending a sports-related entity of the plurality of sports-related entities with a highest likelihood of success for the athlete; and
causing display of the likelihood of success for the athlete for the sports-related entity and the three-dimensional virtual model of the athlete.

18. The method of claim 17, further comprising:
facilitating a contract between the sports-related entity and a representative of the athlete; and
facilitating a transaction between the sports-related entity and the athlete.

19. The method of claim 18, wherein the contract includes Name, Image, and Likeness (NIL) and the transaction is payment for products or services sold under NIL.

20. The method of claim 18,
wherein the athlete is a professional athlete, and the sports-related entity includes a professional sports organization and a third-party company,
wherein the transaction includes a first payment for playing for the professional sports organization and a second payment for marketing a brand of the third-party company.

\* \* \* \* \*